Dec. 6, 1927.  1,652,070
F. TREFZ
AUTOMATIC STARTING AND STOPPING ARRANGEMENT FOR TURBINES
Filed Oct. 19, 1926   5 Sheets-Sheet 1

Inventor:
Friedrich Trefz
By
Attorney.

Dec. 6, 1927.
1,652,070
F. TREFZ
AUTOMATIC STARTING AND STOPPING ARRANGEMENT FOR TURBINES
Filed Oct. 19. 1926
5 Sheets-Sheet 3

Inventor:
Friedrich Trefz
By
Attorney.

Dec. 6, 1927.                                          1,652,070
F. TREFZ
AUTOMATIC STARTING AND STOPPING ARRANGEMENT FOR TURBINES
Filed Oct. 19, 1926          5 Sheets-Sheet 4
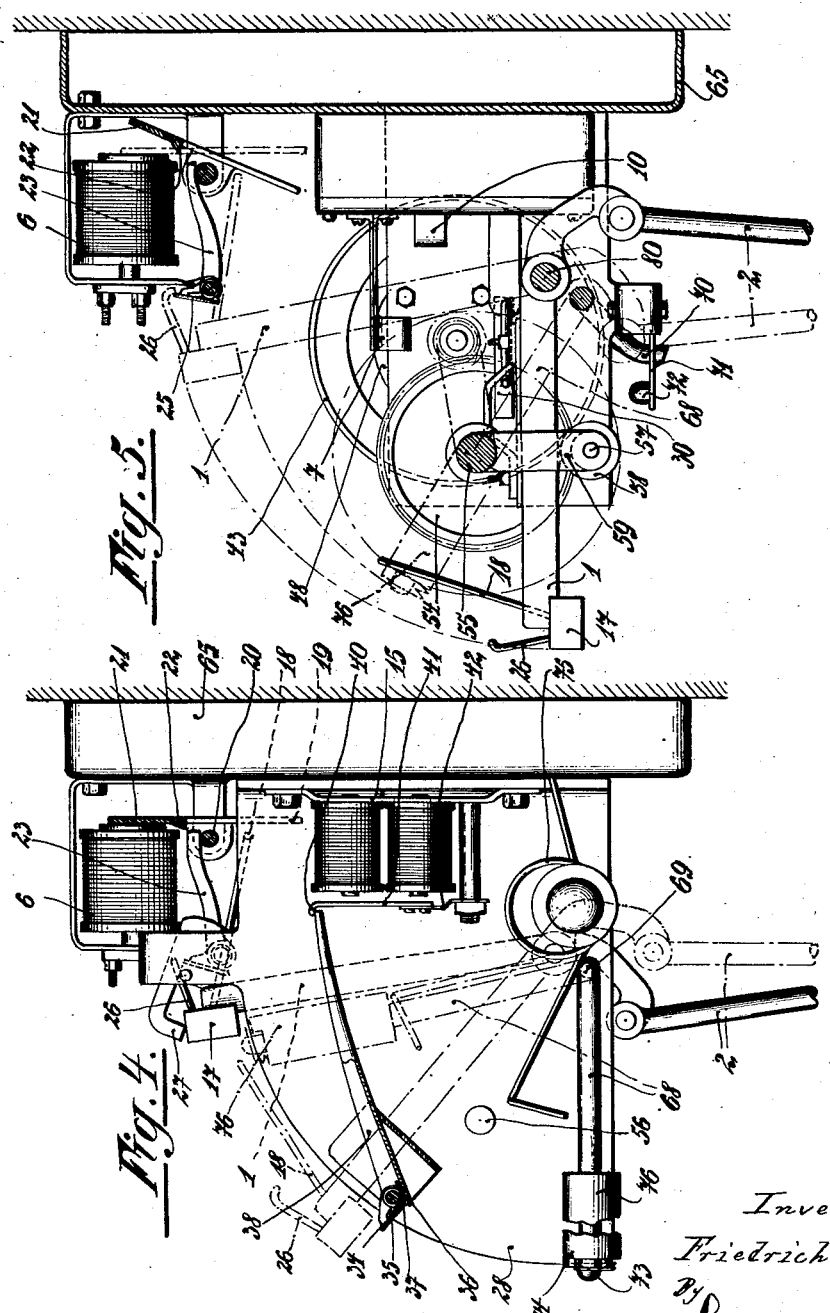
Inventor:
Friedrich Trefz
By
Attorney.

Dec. 6, 1927.
F. TREFZ
1,652,070
AUTOMATIC STARTING AND STOPPING ARRANGEMENT FOR TURBINES
Filed Oct. 19, 1926    5 Sheets-Sheet 5
*Fig.6.*
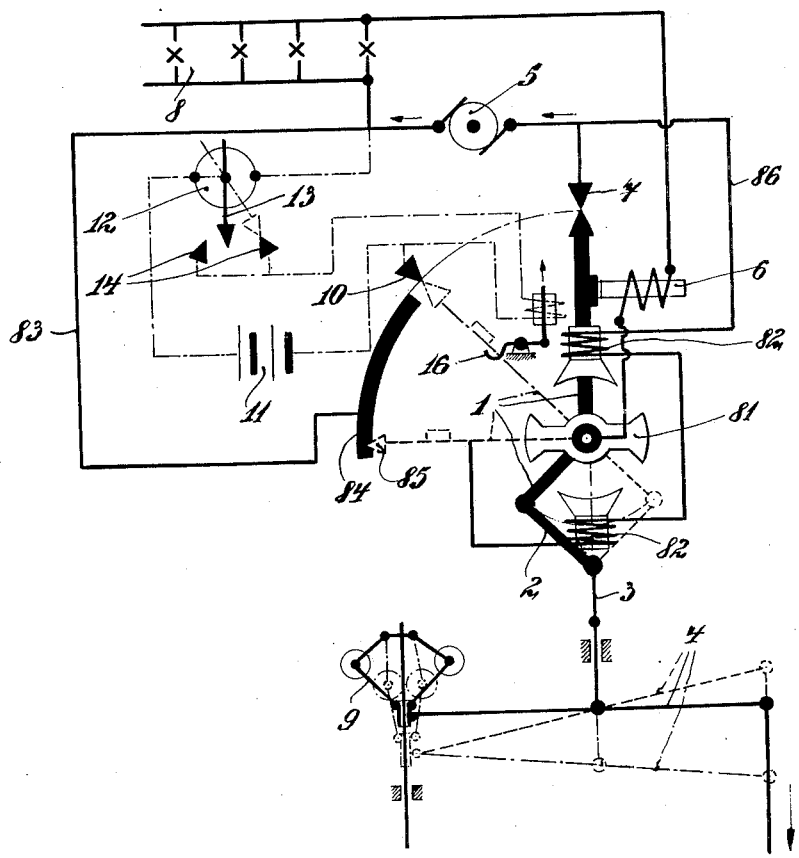
Inventor:
Friedrich Trefz
By
Attorney.

Patented Dec. 6, 1927.

1,652,070

UNITED STATES PATENT OFFICE.

FRIEDRICH TREFZ, OF GROSSASPACH, NEAR BACKNANG, GERMANY.

AUTOMATIC STARTING AND STOPPING ARRANGEMENT FOR TURBINES.

Application filed October 19, 1926, Serial No. 142,751, and in Germany December 9, 1924.

Private hydraulic power plants such as hydraulic turbines and dynamos coupled therewith and serving on land to meet the needs of mansions, individual houses, mills etc. are subject to the varying demands as to the requirement of power. For example the external electric circuit or network of wiring is generally not required during the whole night and at this time the turbine operates unloaded.

In such plant it has therefore been proposed to provide current accumulators as for example accumulator-batteries to which the unused current is fed in order that it may be at disposal when required. These installations require special and careful expert attendance as they are very sensitive. Generally however the possessor of such an installation has not the necessary technical knowledge so that the accumulators quickly run down or become exhausted.

It is known to effect the starting and stopping of turbines automatically and in such manner that the device controlling the admission of the driving liquid to the turbine is retained in the open position by means of a solenoid disposed in the current consumption circuit or wiring network and simultaneously therewith controls a switch which connects the external or current consumption circuit with a generator driven by the turbine, so that when the said circuit is unused the admission of the driving liquid to the turbine ceases but starts again when the circuit is required for use.

This invention relates to such arrangements and consists therein that the member or device controlling the switch and the admission of driving liquid to the turbine is so constructed and arranged that it permits of the admission of driving liquid to the turbine in two limit positions and prevents the admission of the said driving liquid in middle position, into which it automatically moves in a manner known per se from the first limit position on stoppage of current consumption and from which position it falls automatically into the second limit position on the reinsertion of the circuit for use or resumption of current consumption, and is mechanically returned dependent on the number of revolutions of the turbine into the first driving position. By this arrangement in which the task of releasing the device in the middle position controlling the switch and the admission of driving liquid falls solely to the auxiliary circuit, it is possible to use an ordinary primary battery which can be easily replaced whilst in the arrangements heretofore proposed heavy accumulators were required the use of which according to the present invention can be wholly avoided.

The arrangement according to the present invention consists essentially therein that a movable controlling member for example a lever, which is connected with an arrangement controlling the supply of liquid to the turbine, such an arrangement being for example the positive return movement of a servo-motor, is retained in its position by the external circuit by means of a magnet. When current ceases to flow in the external circuit while all the interconnected circuits are cut out, the aforementioned lever by gravity or by special means as by spring power, a weight or equivalent moves into a position in which it cuts off the supply of liquid to the turbine. If the external circuit be now closed at any one place the lever is moved into the third position by auxiliary current from a weak current source, such as a primary battery or the like which in this position of the lever is connected with the circuit. In this third position of the lever the supply of water to the turbine is released and the servo-motor is allowed to move freely. A further arrangement viz the restoring arrangement moves the lever back into its first position when the number of revolutions of the turbine necessary for the production of current is attained. Simultaneously therewith the dynamo generator driven by the turbine is coupled with the external circuit and the lever is again retained in position by the magnet.

The controlling arrangement consists for example of a centrifugal governor, which on the required number of revolutions of the turbo-generator being attained, cuts in a crank shaft or an eccentric drive by the displacement of a shaft, the said crank shaft or eccentric drive restoring the controlling lever to its driving position.

An armature may be secured on the axis of the controlling lever, which armature is under the influence of a magnet energized by the dynamo-current and rotatable with the lever as soon as the dynamo-current has reached a certain strength. The magnet is de-energized when the controlling lever exceeds its middle position at which time the dynamo is coupled with the external circuit and the controlling lever is retained in its uppermost position by a further magnet disposed in the circuit.

In order that the invention may be clearly understood and readily carried into effect reference is made to the accompanying drawing which shows diagrammatically and by way of example a constructional form in accordance with the present invention.

Figure 4 is an end view of the arrangement showing the controlling lever in the driving position the position of the said lever being indicated in the dot and dash lines when the turbine is inoperative or stopped.

Figure 5 is a cross section of the arrangement showing the controlling lever in the starting position.

Figure 6 is a side view showing diagrammatically the magnetic arrangement for returning the controlling lever from the lowermost position to the uppermost position.

Figure 1:
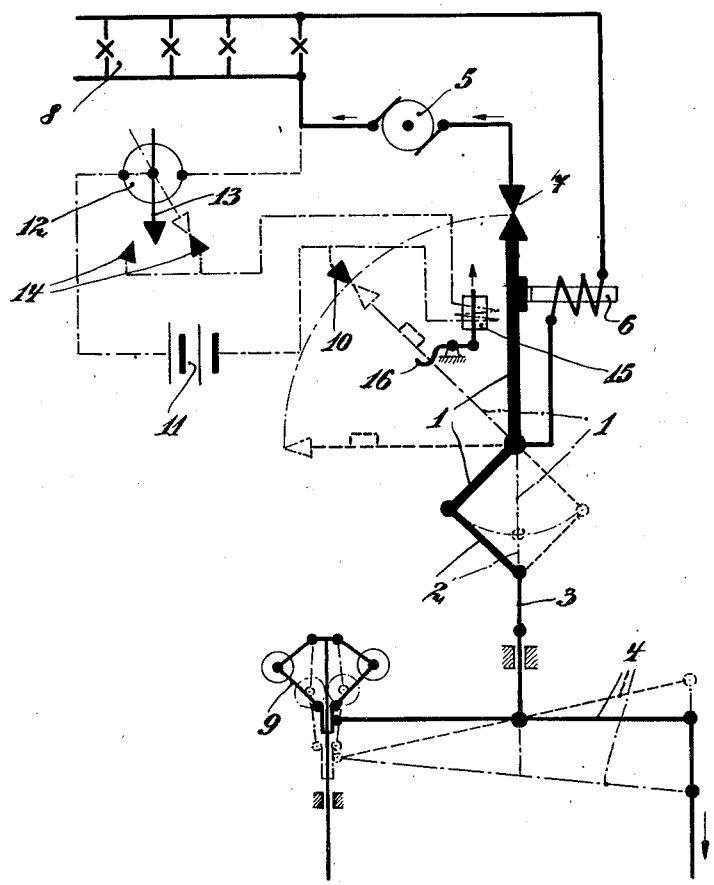
Figure 1 is a diagram showing a starting and stopping arrangement as well as the electrical circuit according to the present invention.

According to the present invention one arm of a bell-crank lever 1 is positively connected by means of an intermediate lever 2 and a straight guided rod 3 with the return arm 4 of a diagrammatically indicated servo-motor. The other arm is held fast during the drive by an electro-magnet 6 the said electro-magnet being inserted in the circuit of the generator 5 driven by the turbine (Figure 1, wholly attracted position). In this position of the controlling lever 1 the servo-motor has free play in controlling the turbine. The electric circuit of the dynamo 5 is closed through the contact 7 and serves to feed the external circuit 8. If the external circuit 8 be currentless all current consumers are cut out and the magnet 6 is de-energized so that the controlling lever 1 is free. The latter falls by gravity or by special arrangement, for example, by the action of a spring, weight or equivalent into the dot and dash position shown in Figure 1. In this position the rods 2, 3 and the return drive 4 are forced downward so that the servo-motor closes the admission of water to the turbine and the latter becomes consequently inoperative. The amount of displacement of the downward movement of the rods 2, 3 is determined so that the centrifugal governor 9 of the servo-motor cannot open. Simultaneously the dynamo circuit is interrupted at 7 and the controlling lever through a contact 10 closes an auxiliary circuit which is fed with current from a low tension current source for example from one or more than one primary battery 11 so that the auxiliary circuit is connected in parallel with the main positive lead from the dynamo. If now the external circuit 8 be closed in any one position by the action of a current consumer for example the switching on of an incandescent lamp, then the auxiliary circuit is completely closed and the current therein flows through a relay for example a galvanometer 12 whose armature 13 thereof by deflection closes a contact 14. This closes a further weak current circuit which is inserted in parallel to the circuit of the relay galvanometer 12 and causes the switching into this circuit of a release magnet 15 which withdraws the catch lever 16 so that the said lever 1 falls further down. The switching-in of the galvanometer 12 is required because the weak current in consequence of the resistance of the circuit may be insufficient to excite directly the magnet 15.

The controlling lever 1 now moves into the dotted position shown in Figure 1, cuts out the auxiliary circuit through the contact 10 and the rods 2, 3, as well as the return drive 4 are again raised and the water inlet is again opened to the turbine.

The previously mentioned return arrangement acts in such manner that the controlling lever 1 is returned again into its initial driving position when the turbine has reached its full number of revolutions, the result being that the circuit of the dynamo 5 is closed through the contact 7 so that the external circuit 8 again receives current and the magnet 6 again retains the controlling lever.

The controlling lever 1 carries at the upper end of its free arm a cross plate 17 Figure 4, which by reason of its weight causes the lever 1 to drop and carries the retaining devices. Retention is effected not directly by the magnet 6 but indirectly. If the controlling lever be again moved into the driving position by the return arrangement an arm 18 secured to the cross plate 17 precedes the plate 17, and acts on the lower end 19, Figures 4, 5 of a plate 21 rotatably secured to the axis 20 so that the same moves against the magnet 6 and is there magnetically retained. A projection 22 on the plate 21 then comes into position over the free end of the lever 23 which is rotatably mounted as at 24 and is connected with a resilient plate 25 compelled to move on its pivot in the direction of an outward movement of its free end. The plate 25 can move resiliently backwards so as to allow of the movement of a hook 26 on the cross member 17 of the controlling lever 1, whereby the lever 23 engages with its free end on the axis 20. As soon as the hook 26 comes into position behind the plate 25 the latter moves resiliently upward and holds the hook 26 and also the controlling lever 1 stationary in the driving position as long as the projection 21 prevents the upward movement of the lever 23.

In order to prevent a too powerful springing back of the controlling lever 1 and the consequent release of the plate by the magnet 6 first energized at this moment a wide hook-shaped catch 27 is provided which is rotatably supported in a side plate 28. The latter is formed as a bell-crank lever and has on its under side a projection 29 against which the cross member 17 of the controlling lever 1 strikes whereby the hook-shaped catch 27 is permitted to engage the cross member 17 of the controlling lever 1. The hook 27 holds the lever 1 stationary for a short time until it sinks back by reason of its own weight, meanwhile the hook 26 has engaged the resilient plate 25 of the lever 23.

If the magnet 6 in consequence of cutting out the circuit be de-energized the plate 21 falls away from the magnet 6 so that the projection 22 releases the lever 23 which now tilts upwards and releases the hook 26.

Figure 2:
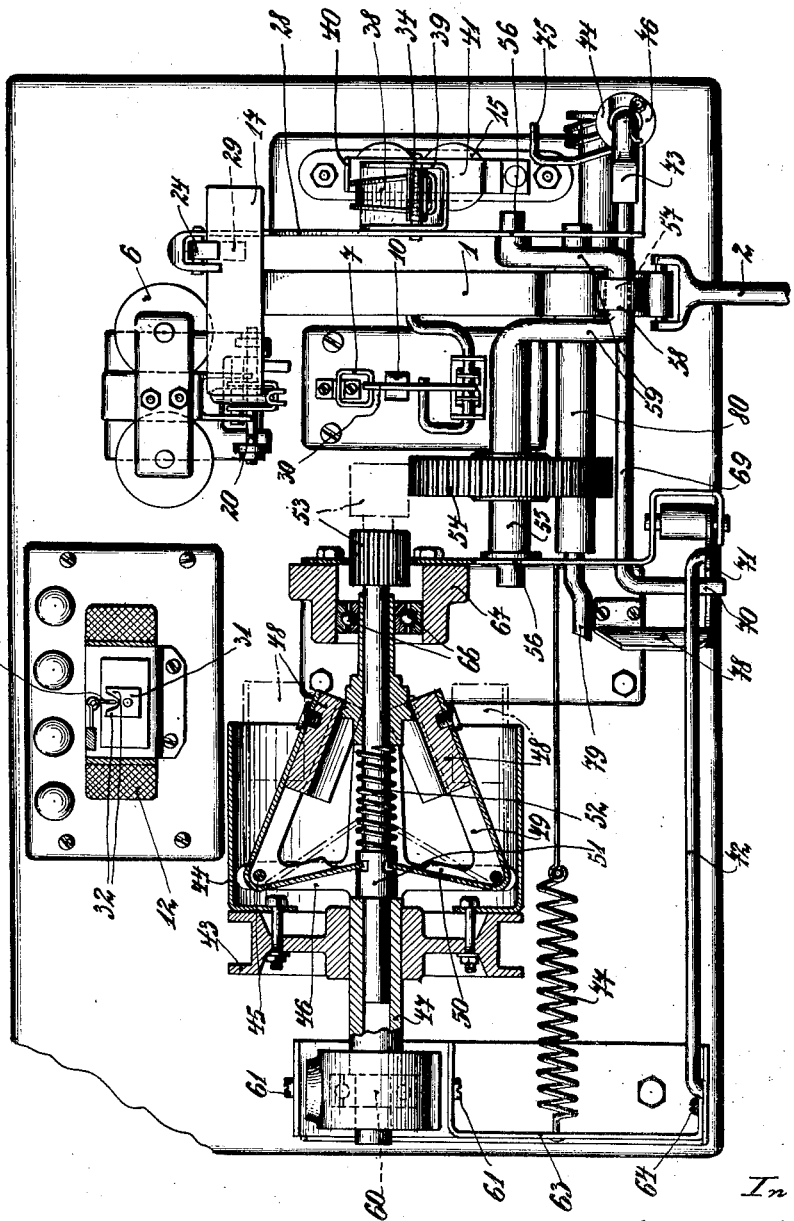
Figure 2 is a front view showing the arrangement partly in section, and the controlling lever of the turbine in the driving position.

The controlling lever 1 is now free and drops by reason of its own weight until it is retained by a stop 34 whereby it actuates the rods 2, 3 in the closure direction and cuts out the dynamo current at the contact 7 by releasing the switching lever 30 positively connected therewith, Figure 2.

Simultaneously therewith the auxiliary circuit is switched in through the contact 10. If such auxiliary circuit be closed through the main circuit auxiliary current flows through the galvanometer 12 Figure 2, serving as a relay and moves an armature 31 against its stop. Both legs 32 thereof serve as contacts for a resilient contact pin 33 lying between them, they bear on movement of the armature and thereby close the current circuit through the magnet 15, Figures 2, 4.

The magnet 15 serves to attract the stop holding the controlling lever 1 in its middle position. This stop consists of a plate 34 which is rotatably supported on a projection 35. The plate 34 by reason of its resiliency can turn towards the right upwardly whilst its lower end which is under the influence of a spring 36 is held stationary against the projection 37 of a lever 38 likewise rotatable about a projection 35 so that it is connected on the left hand rotation rigidly therewith its free end lying on a fixed support 39. The end of the lever 38 which is under the lever-action of the plate 34 loaded by the controlling lever 1 tends to rise upwardly but is held stationary by an armature 41 provided with a catch 40. The armature 41 is held clear of the magnet 15 by a spring 42 and thereby brought into engagement with the lever 38. If the magnet 15 be now energized by weak current from the galvanometer 12 it attracts the armature 41 whose catch 40 releases the lever 38 so that the latter can rise. The controlling lever 1 then rises over the plate 34 and falls into its lowest limit position where it is engaged by the restoring device Figure 5.

In this lowest limit position the turbine is independent of the current-circuits and works unloaded until the returning arrangement has restored the controlling lever into the driving position. Further the current-circuit of the dynamo is not yet closed on the external circuit in order that the turbine may not be loaded on starting.

Figure 3:
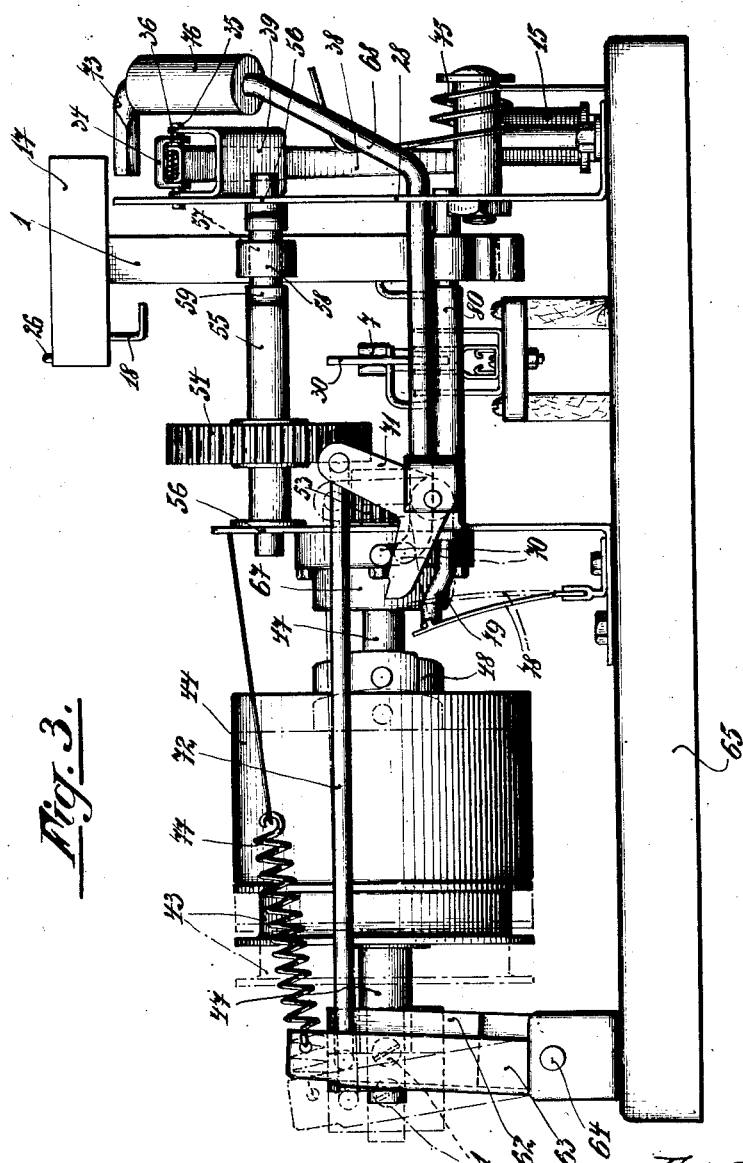
Figure 3 is a plan view of the arrangement showing the controlling lever in the starting position and the position of the centrifugal governor in dot and dash lines such position depending on the return of the controlling lever to the driving position.

The turbine then runs free after which the controlling lever 1 in the lowest limit position actuates the water inlet see Figures 2, 3 and 5. The grooved pulleys 43 carry the cylindrical protective casing 44 of a centrifugal governor whose pendulum pivots 45 are connected rigidly with the shaft 47 of the pulleys 43 by arms 46. The swinging masses 48 of the centrifugal governor are rotatably supported on the pins 45 by means of bell-crank levers 49 whereby the free limbs 50 of the levers 49 are connected with a shaft 51 passing through the hollow shaft 47 and supported thereby. The oscillating masses 48 tend to separate from their axes in consequence of the centrifugal force whereby the shaft 51 is axially displaced by the bell-crank levers 49 and against the action of a spring 52. The tension of the spring 52 is such that the oscillating masses themselves can only turn on their pivots when the turbine has reached its complete number of revolutions, then however follows the axial displacement of the shaft 51 backwardly, whereby a gear wheel 53 on the end of the shaft 51 is caused to engage with a gear wheel 54. The shaft 55 on which the gear wheel 54 is mounted is interrupted between its end bearings 56 so as to form a crank. On this crank pin 56 is rotatably supported a roller 58. The controlling lever lies on the roller 58 between the crank arms 59 when in its lowest limit position.

If now the shaft 55 be driven by the belt pulley 43 through the drive gear wheels 53, 54 which are caused to engage by the action of the centrifugal governor then the controlling lever 1 is quickly raised by the crank pin and moves into its driving position where it is retained in the described manner.

To prevent further rotation of the shaft 55 an arrangement is provided by which the returning or restoring arrangement is cut out as soon as the controlling lever 1 has reached its driving position. For this purpose the whole of the hitherto described returning or restoring arrangement is supported in an axially displaceable manner so that the gear wheel 53 can be disengaged from the gear wheel 54, when it is displaced by the centrifugal governor for engagement.

The end of the hollow shaft 47 is for this purpose supported with its ball bearing 60 in a bearing housing 62 rotatable about vertical journals 61, whose base plate 63 is likewise rotatable about its securing position on the wall plate 65 by means of vertical journals 64. Simultaneously the forward bearing housing 67 situated next to the drive 53 is fitted so that by swinging of the rear bracket bearing about its wall journals 64 an axial displacement of the hollow shaft 47 together with the ball bearing 66 and gear wheel 53 takes place, which thereby partly enters into the bearing housing 67, see Figure 2.

This swinging of the base plate 63 actuates a positioning lever 68 which is connected with the base plate temporarily at the end of the movement by a co-operating lever 70 secured on its axis 69 which co-operating lever bears against one link of a bell-crank lever 71, whilst the other arm of the bell-crank lever 71 is pivotally connected with a push-rod 72 pivotally connected to the base plate 63.

The positioning lever 68 is provided on its free end with a co-operating lever 73 which is pivotally and resiliently connected therewith in such manner that the co-operating lever in the direction of an outward movement is rigidly connected with the positioning lever 68 whilst it lies against a stop 74 on the said lever, whilst under an oppositely acting force it deflects by reason of its resiliency. This positioning lever 68 is carried forward by means of the co-operating lever 73 and controlling lever 1 in its outward movement from the lower limit position to the driving position whereby a spring 75 is tensioned. The pivotal point of the positioning lever 68 is so selected that the path of its co-operating lever 73 coincides with that of the controlling lever until shortly before the uppermost position. Here however the controlling lever 1 slides over the co-operating lever 73 so that the positioning lever 68 is projected back partly under the influence of the weight of 73 and partly under the action of a spring 76 and falls into its lowest position whereby it swings the bell-crank lever 71 about its bearing by means of the co-operating lever 70 and effects through the thrust rod 72 the displacement of the hollow shaft 47 together with the belt pulleys 43, centrifugal governor and gear wheel 53, Figures 2 and 4. The tension of a spring 77 which is connected on the one hand to the movable base plate 63 and on the other hand to a fixed part of a base plate 55 limits this axial displacement.

Meanwhile one arm of the bell-crank lever 71 comes into position behind a resilient stop 78 so that the returning or restoring arrangement is held stationary in the axial thrust back position.

Should the controlling lever later on fall out of the middle position into the lowest limit position Figure 5, the resilient stop 78 is then pressed back by a lever 79 on the axis 80 of the controlling-lever 1 so that the bell-crank lever 71 under the influence of a spring 77 can jerk or spring quickly into its original position. The positioning lever 68 is raised in consequence by the lever 70 and the movable base plate 63 with the hollow shaft 47, the centrifugal governor and the gear 53 is axially displaced and so far projected that the movement of the rotating centrifugal governor may effect engagement of the gear wheel 53 with the gear wheel 54 whereon the working cycle of the controlling and positioning lever begins anew.

These constructional forms and arrangements of the several parts are only given by way of example and may be varied in many respects without departing from the nature of the present invention.

In Figure 6 is diagrammatically shown how the controlling lever 1 dependent on the number of revolutions of the turbines may be moved from its lowest position into its uppermost position. The switching arrangements and other devices or contrivances are the same as before only the mechanical returning or restoring arrangement with the centrifugal governor is omitted. On the axis of the controlling lever 1 is secured an armature 81 which is under the influence of a solenoid 82. If the controlling lever be in its lowest position the solenoid is energized by the dynamo current which flows through a lead 83 to a slip contact 84 from which it returns through a slip spring 85 connected with the controlling lever 1 to the solenoid winding 82 and from thence through the lead 86 to the dynamo. The arrangement is such that the energization of the magnet only takes place to rotate the armature 81 with the controlling lever when the dynamo has attained its full number of revolutions. The armature 81 is then moved with the controlling lever 1 into the uppermost position whereby the slip contact 84 on reaching the middle position is cut out. The controlling lever 1 is then retained in the uppermost position again by the magnet 6 lying in the external circuit. Simultaneously the dynamo is switched onto the external circuit to which it delivers full current.

What I claim is:

1. An automatic starting and stopping arrangement for a turbo-dynamo comprising a controlling member for regulating the admission of the driving medium; a switch which when acted on mechanically by said member causes the connection of an external circuit with the dynamo or of a circuit with an auxiliary power source; and a driving means admission member retained in the open position on current consumption by a solenoid disposed in the external circuit, the controlling member controlling the switch and the admission of the driving medium being arranged and constructed so that it opens the inlet for the driving medium in two limit-positions and closes in the intermediate middle position into which it arrives from the first limit position by the automatic rupture of the external circuit current and from which it automatically falls into the second limit position on reinsertion of the external circuit and is mechanically restored into the first limit position dependent on a definite number of revolutions of the turbine.

2. An automatic starting and stopping arrangement for a turbo-dynamo comprising a controlling member for regulating the admission of the driving medium; a switch which when acted on mechanically by said member causes the connection of an external circuit with the dynamo or of a circuit with an auxiliary power source; a driving means admission member retained in the open position on current consumption by a solenoid disposed in the external circuit, the controlling member controlling the switch and the admission of the driving medium being arranged and constructed so that it opens the inlet for the driving medium in two limit-positions and closes in the intermediate middle position into which it arrives from the first limit position by the automatic rupture of the external circuit current and from which it automatically falls into the second limit position on reinsertion of the external circuit and is mechanically restored into the first limit position dependent on a definite number of revolutions of the turbine, said controlling member comprising a bell-crank controlling lever which is retained in the upper limit position by a magnet during the drive and drops by its own weight into the middle position which is limited by a stop and in which the dynamo current circuit is cut out; and a holding magnet and an auxiliary circuit leading from and controlled by a relay magnet inserted so that on the switching-in of a consumer in the circuit the controlling lever which was held in the middle position now drops into the second limit position in which it again opens the power admission inlet to the turbine.

3. An automatic starting and stopping arrangement for a turbo-dynamo comprising a controlling member for regulating the admission of the driving medium; a switch which when acted on mechanically by said member causes the connection of an external circuit with the dynamo or of a circuit with an auxiliary power source; a driving means admission member retained in the open position on current consumption by a solenoid disposed in the external circuit, the controlling member controlling the switch and the admission of the driving medium being arranged and constructed so that it opens the inlet for the driving medium in two limit-positions and closes in the intermediate middle position into which it arrives from the first limit position by the automatic rupture of the external circuit current and from which it automatically falls into the second limit position on reinsertion of the external circuit and is mechanically restored into the first limit position dependent on a definite number of revolutions of the turbine, said controlling member comprising a bell-crank controlling lever which is retained in the upper limit position by a magnet during the drive and drops by its own weight into the middle position which is limited by a stop and in which the dynamo current circuit is cut out; a holding magnet and an auxiliary circuit leading from and controlled by a relay magnet inserted so that on the switching-in of a consumer in the circuit the controlling lever which was held in the middle position now drops into the second limit position in which it again opens the power admission inlet to the turbine; and a switch lever positively connected with the controlling lever for cutting in the dynamo into the circuit in the upper limit position.

4. An automatic starting and stopping arrangement for a turbo-dynamo comprising a controlling member for regulating the admission of the driving medium; a switch which when acted on mechanically by said member causes the connection of an external circuit with the dynamo or of a circuit with an auxiliary power source; a driving means admission member retained in the open position on current consumption by a solenoid disposed in the external circuit, the controlling member controlling the switch and the admission of the driving medium being arranged and constructed so that it opens the inlet for the driving medium in two limit-positions and closes in the intermediate middle position into which it arrives from the first limit position by the automatic rupture of the external circuit current and from which it automatically falls into the second limit position on reinsertion of the external circuit and is mechanically restored into the first limit position dependent on a definite number of revolutions of the turbine, said controlling member comprising a bell-crank controlling lever which is retained in the upper limit position by a magnet during the drive and drops by its own weight into the middle position which is limited by a stop and in which the dynamo current circuit is cut out; a holding magnet and an auxiliary current circuit leading from and controlled by a relay magnet inserted so that on the switching-in of a consumer in the circuit the controlling lever which was held in the middle position now drops into the second limit position in which it again opens the power admission inlet to the turbine; a switch lever positively connected with the controlling lever for cutting in the dynamo into the circuit in the upper limit position; and a two armed lever comprising said stop and one of the arms being retained by an electrically actuated retaining device.

5. An automatic starting and stopping arrangement for a turbo-dynamo comprising a controlling member for regulating the admission of the driving medium; a switch which when acted on mechanically by said member causes the connection of an external circuit with the dynamo or of a circuit with an auxiliary power source; a driving means admission member retained in the open position on current consumption by a solenoid disposed in the external circuit, the controlling member controlling the switch and the admission of the driving medium being arranged and constructed so that it opens the inlet for the driving medium in two limit-positions and closes in the intermediate middle position into which it arrives from the first limit position by the automatic rupture of the external circuit current and from which it automatically falls into the second limit position on reinsertion of the external circuit and is mechanically restored into the first limit position dependent on a definite number of revolutions of the turbine, said controlling member comprising a bell-crank controlling lever which is retained in the upper limit position by a magnet during the drive and drops by its own weight into the middle position which is limited by a stop and in which the dynamo current circuit is cut out; a holding magnet and an auxiliary circuit leading from and controlled by a relay magnet inserted so that on the switching-in of a consumer in the circuit the controlling lever which was held in the middle position now drops into the second limit position in which it again opens the power admission inlet to the turbine; and a centrifugal governor adapted to cause the turbine to raise said lever, said governor being driven by the turbine which on reaching a definite speed positively connects the controlling lever with the turbine.

6. An automatic starting and stopping arrangement for a turbo-dynamo comprising a controlling member for regulating the admission of the driving medium; a switch which when acted on mechanically by said member causes the connection of an external circuit with the dynamo or of a circuit with an auxiliary power source; a driving means admission member retained in the open position on current consumption by a solenoid disposed in the external circuit, the controlling member controlling the switch and the admission of the driving medium being arranged and constructed so that it opens the inlet for the driving medium in the two-limit positions and closes in the intermediate middle position into which it arrives from the first limit position by the automatic rupture of the external circuit current and from which it automatically falls into the second limit position on reinsertion of the external circuit and is mechanically restored into the first limit position dependent on a definite number of revolutions of the turbine, said controlling member comprising a bell-crank controlling lever which is retained in the upper limit position by a magnet during the drive and drops by its own weight into the middle position which is limited by a stop and in which the dynamo current circuit is cut out; a holding magnet and an auxiliary circuit leading from and controlled by a relay magnet inserted so that on the switching-in of a consumer in the circuit the controlling lever which was held in the middle position now drops into the second limit position in which it again opens the power admission inlet to the turbine; a centrifugal governor adapted to cause the turbine to raise said lever, said governor being driven by the turbine which on reaching a definite speed positively connects the controlling lever with the turbine; a cranked shaft having a gear wheel thereon, said crank cooperating with the controlling lever; and a gear wheel associated with the centrifugal governor and adapted to mesh with the first-mentioned gear wheel to raise the controlling lever into the driving position.

7. An automatic starting and stopping arrangement for a turbo-dynamo comprising a controlling member for regulating the admission of the driving medium; a switch when acted on mechanically by said member causes the connection of an external circuit with the dynamo or of a circuit with an auxiliary power source; a driving means admission member retained in the open position on current consumption by a solenoid disposed in the external circuit, the controlling member controlling the switch and the admission of the driving medium being arranged and constructed so that it opens the inlet for the driving medium in two limit-positions and closes in the intermediate middle position into which it arrives from the first limit position by the automatic rupture of the external circuit current and from which it automatically falls into the second limit position on reinsertion of the external circuit and is mechanically restored into the first limit position dependent on a definite number of revolutions of the turbine, said controlling member comprising a bell-crank controlling lever which is retained in the upper limit position by a magnet during the drive and drops by its own weight into the middle position which is limited by a stop and in which the dynamo current circuit is cut out; a holding magnet and an auxiliary circuit leading from and controlled by a relay magnet inserted so that on the switching-in of a consumer in the circuit the controlling lever which was held in the middle position now drops into the second limit position in which it again opens the power admission inlet to the turbine, said controlling lever having a hook at the end thereof; a rotatably supported lever having a resilient projection which engages with the hook on the controlling lever to retain said controlling lever in the driving position; and a supporting plate adapted to be attracted by a magnet thereby retaining the rotatably supported lever in locked position.

8. An automatic starting and stopping arrangement for a turbo-dynamo comprising a controlling member for regulating the admission of the driving medium; a switch which when acted on mechanically by said member causes the connection of an external circuit with the dynamo or of a circuit with an auxiliary power source; a driving means admission member retained in the open position on current consumption by a solenoid disposed in the external circuit, the controlling member controlling the switch and the admission of the driving medium being arranged and constructed so that it opens the inlet for the driving medium in two limit-positions and closes in the intermediate middle position into which it arrives from the first limit position by the automatic rupture of the external circuit current and from which it automatically falls into the second limit position on reinsertion of the external circuit and is mechanically restored into the first limit position dependent on a definite number of revolutions of the turbine, said controlling member comprising a bell-crank controlling lever which is retained in the upper limit position by a magnet during the drive and drops by its own weight into the middle position which is limited by a stop and in which the dynamo current circuit is cut out; a holding magnet and an auxiliary circuit leading from and controlled by a relay magnet inserted so that on the switching-in of a consumer in the circuit the controlling lever which was held in the middle position now drops into the second limit position in which it again opens the power admission inlet to the turbine, said controlling lever having a hook at the end thereof; a rotatably supported lever having a resilient projection which engages with the hook on the controlling lever to retain said controlling lever in the driving position; a supporting plate adapted to be attracted by a magnet thereby retaining the rotatably supported lever in locked position; and a rotatably supported hook catch for preventing quick return of the controlling lever.

9. An automatic starting and stopping arrangement for a turbo-dynamo comprising a controlling member for regulating the admission of the driving medium; a switch which when acted on mechanically by said member causes the connection of an external circuit with a dynamo or of a circuit with an auxiliary power source; a driving means admission member retained in the open position on current consumption by a solenoid disposed in the external circuit, the controlling member controlling the switch and the admission of the driving medium being arranged and constructed so that it opens the inlet for the driving medium in the two-limit positions and closes in the intermediate middle position into which it arrives from the first limit position by the automatic rupture of the external circuit current and from which it automatically falls into the second limit position on reinsertion of the external circuit and is mechanically restored into the first limit position dependent on a definite number of revolutions of the turbine, said controlling member comprising a bell-crank controlling lever which is retained in the upper limit position by a magnet during the drive and drops by its own weight into the middle position which is limited by a stop and in which the dynamo current circuit leading from and controlled by a relay magnet inserted so that on the switching-in of a consumer in the circuit the controlling lever which was held in the middle position now drops into the second limit position in which it again opens the power admission inlet to the turbine; a centrifugal governor adapted to cause the turbine to raise said lever, said governor being driven by the turbine which on reaching a definite speed positively connects the controlling lever with the turbine; a cranked shaft having a gear wheel thereon, said crank cooperating with the controlling lever; a gear wheel associated with the centrifugal governor and adapted to mesh with the first-mentioned gear wheel to raise the controlling lever into the driving position; and means for releasing connection between the centrifugal governor and the crank drive when the controlling lever comes into the driving position.

In testimony whereof I affix my signature.

FRIEDRICH TREFZ.